(12) United States Patent
Dziawa et al.

(10) Patent No.: US 7,181,545 B2
(45) Date of Patent: Feb. 20, 2007

(54) NETWORK SYNCHRONIZATION ARCHITECTURE FOR A BROADBAND LOOP CARRIER (BLC) SYSTEM

(75) Inventors: Michael Dziawa, Richmond (CA); Michael Gazier, Nepean (CA)

(73) Assignee: Ciena Corp., Linthicum, MD (US)

( * ) Notice: Subject to any disclaimer, the term of this patent is extended or adjusted under 35 U.S.C. 154(b) by 812 days.

(21) Appl. No.: 10/356,336

(22) Filed: Jan. 31, 2003

(65) Prior Publication Data

US 2004/0006645 A1 Jan. 8, 2004

(30) Foreign Application Priority Data

Jan. 31, 2002 (CA) ................................. 2369805

(51) Int. Cl.
*G06F 15/16* (2006.01)
(52) U.S. Cl. .......................................... 709/250; 714/2
(58) Field of Classification Search ................ 709/250, 709/220, 223, 248; 714/2
See application file for complete search history.

(56) References Cited

U.S. PATENT DOCUMENTS

| | | | | |
|---|---|---|---|---|
| 5,294,842 A | * | 3/1994 | Iknaian et al. ............... | 327/144 |
| 5,331,667 A | * | 7/1994 | Izumi ......................... | 375/356 |
| 5,740,157 A | | 4/1998 | Demiray et al. | |
| 5,982,745 A | | 11/1999 | Wolff et al. | |
| 6,078,595 A | * | 6/2000 | Jones et al. ................. | 370/503 |
| 6,112,241 A | | 8/2000 | Abdelnour et al. | |
| 6,208,665 B1 | * | 3/2001 | Loukianov et al. ......... | 370/486 |
| 6,647,428 B1 | * | 11/2003 | Bannai et al. .............. | 709/245 |
| 6,925,506 B1 | * | 8/2005 | Raza et al. .................... | 710/52 |

* cited by examiner

*Primary Examiner*—David Y. Eng
(74) *Attorney, Agent, or Firm*—Merek, Blackmon & Voorhees, LLC

(57) ABSTRACT

A combined wide area network (WAN) port/synchronization unit that receives inputs including data and timing information and that synchronizes the data for transmission. The unit includes the following components. A network interface receives the input and removes data and primary timing information from the input. A data-path function processes the data. A reference selection unit receives timing information from the network interface as well as timing information from a secondary combined WAN port/synchronization unit. A synchronization control unit selects the most reliable timing information from the plurality of timing information inputs to the reference selection unit. A multiplexor multiplexes the timing information with the processed data across a link.

10 Claims, 2 Drawing Sheets

NETWORK SYNCHRONIZATION ARCHITECTURE FOR A BROADBAND LOOP CARRIER (BLC) SYSTEM

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention relates generally to a system combining a synchronization function of a network element with a network interface function.

A Digital Loop Carrier (DLC) System is a component of a communications network that bundles a number of individual phone line signals into a single multiplexed digital signal for local traffic between a telephone company central office and a business complex, subscriber, or other outlying service area. Digital loop carriers can carry traffic for regular phone calls (Plain Old Telephone Service or POTS) and Integrated Services Digital Network (ISDN) service. More recently, approaches have been developed for using DLCs to handle the higher bandwidth of Digital Subscriber Loop (DSL) service. Such approaches are often referred to as Broadband Loop Carrier (BLC) systems. FIG. 1 generally shows such a communications network.

In order for the BLC system to function, it must remain synchronous with respect to network data signal timing. Further, each network element in the network requires a stable clock signal synchronous to the network data signals in order to maintain proper signal timing. For this reason, network elements such as BLC systems often extract synchronization signals either from a signal source or from a dedicated timing source such as a Building Integrated Timing Source (BITS) generator.

The signal sources, or data signal inputs, to a network element can be in the form of optical signals, such as OCN (Optical Carrier level N), or electrical signals, such as T1. Both types of signal carry data in the form of data bits and synchronization information in the form of signal transitions. Network elements typically extract both data and clock information from their inputs. The synchronization information typically requires local processing in the form of filtering in order to make it suitable for synchronization with the local network element. Since the signal has passed over an imperfect transmission network, periodic or random variations in the period of the digital signal may occur. A phase-locked loop (PLL) and stable local oscillator perform this function. The filter removes short and long-term variations in frequency of the recovered synchronization signals. The local stabilized oscillator also allows the network element to remain synchronized to the network if a connection to the network is temporarily lost, within tolerances specified in BellCore standard GR-1244-CORE.

In network elements serving a large number of end users, reliability of the synchronization system is typically designed to be more robust than that found in smaller systems. In order to achieve the required level of reliability, these systems typically employ a form of redundant synchronization hardware along with redundant synchronization inputs from the network. Along with a control element, these redundancy schemes are able to automatically recover either from synchronization input failures or hardware failures by switching to the backup. The requirements for various levels of redundancy are specified in BellCore documents GR-1244-CORE, GR-303-CORE, and GR-253-CORE.

In a typical network element, dedicated hardware modules in the form of circuit boards perform the synchronization. These modules receive synchronization signals from the communications network and provide the network element with the necessary synchronization signals to provide whatever service it is intended to provide. Since synchronization uses dedicated equipment, the extra equipment occupies space in the system cabinet or shelf, which could otherwise be used to increase functionality. It also adds cost, mechanical complexity, and increased points of potential failure, thereby reducing product reliability.

Therefore, it is an object of the present invention to obviate or mitigate at least some of the above-mentioned disadvantages.

BRIEF SUMMARY OF THE INVENTION

In accordance with an aspect of the present invention, there is provided a combined wide area network (WAN) port/synchronization unit for receiving inputs including data and timing information and for synchronizing the data for transmission. The unit includes the following components. A network interface receives the input and recovers data and primary timing information from the input. A data-path function processes the data. A reference selection unit receives timing information from the network interface as well as timing information from a secondary combined WAN port/synchronization unit. A synchronization control unit selects the most reliable timing information from the plurality of timing information inputs to the reference selection unit. A multiplexor multiplexes the timing information with the processed data across a link.

In accordance with another aspect of the present invention, there is provided a redundant network synchronization system. The system includes the following components. A primary combined WAN port/synchronization unit receives and synchronizes data from a network. A secondary combined WAN port/synchronization unit receives and synchronizes data from the network. The secondary unit is coupled with the primary unit for communicating timing information, received from the network, therebetween. A primary system switch element receives data and timing information from one of the primary and the secondary combined WAN port/synchronization units for switching data to a predefined destination.

It is an advantage of the present invention that an increased number of subscribers can be served from the same volume of equipment. Space in a system, which would otherwise be occupied by a timing module, can now be used to house additional subscriber line interfaces.

BRIEF DESCRIPTION OF THE DRAWINGS

An embodiment of the invention will now be described by way of example only, with reference to the following drawings in which.

DETAILED DESCRIPTION OF THE INVENTION

Figure 1:
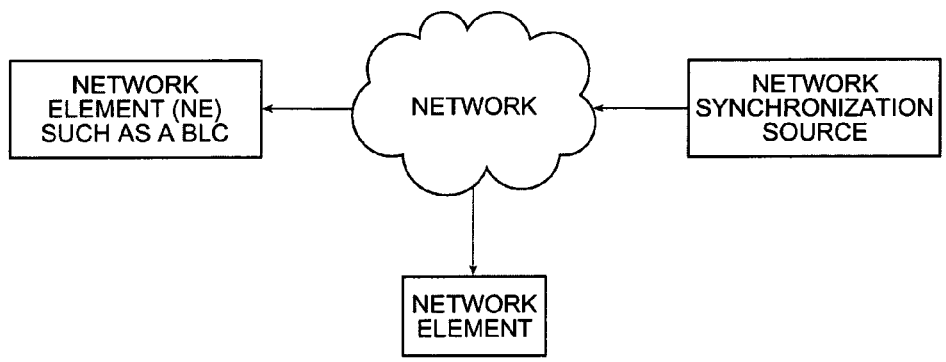
FIG. 1 is block diagram of a communication network.
Figure 2:
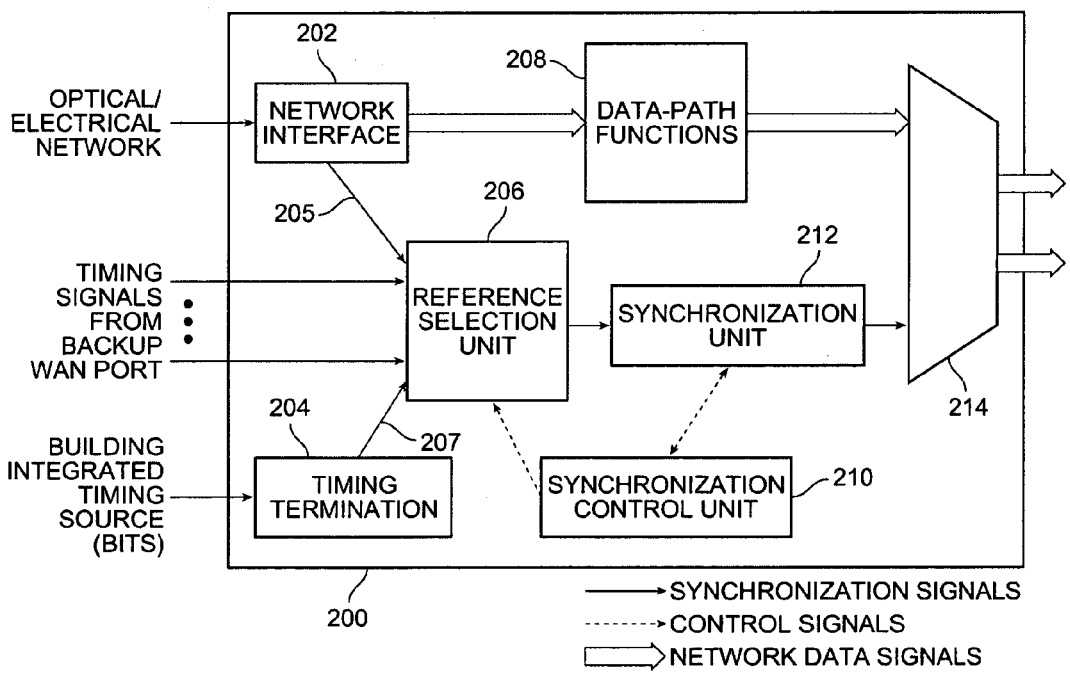
FIG. 2 is a schematic diagram of a combined WAN-synchronization port.

For convenience, like numerals in the description refer to like structures in the drawings. Referring to FIG. 2, a combined wide area network (WAN) port and synchronization unit is illustrated generally by numeral 200. The port/unit 200 includes a network interface 202, a timing termination unit 204, a reference selection unit 206, a synchronization control unit 210, a synchronization unit 212, a data-path function 208, and a multiplexor 214.

The network interface 202 has an input for coupling to an incoming network signal and outputs coupled to the reference selection unit 206 and the data-path function 208. The output from the data-path function 208 is coupled to the multiplexor 214. The timing termination unit 204 has an input for coupling to a building integrated timing source (BITS), and an output coupled to the reference selection unit 206. The reference selection unit 206 additionally has inputs for coupling to timing signals from other WAN ports, and an input coupled to the synchronization control unit 210. The output from the reference selection unit 206 is coupled to an input of the synchronization unit 212, which has another input coupled to the synchronization control unit 210. The output of the synchronization unit 212 is coupled to the multiplexor 214. The multiplexor 214 has an output for coupling to a local system (not shown).

The network interface 202 terminates a signal from a network in order to provide telephony and data service to end-users, or subscribers (not shown). Typically, the signal is an electrical or optical signal. Electrical carrier standards include the T-carrier system, such as T1 and T3. Optical signals include optical signals such as OC-x, where the transmission speed is x times the base speed OC-1 of 51.84 Mbps. Furthermore, the standards include electrical signals that are converted to optical signals, such as Synchronous Transport Signal (STS) and Synchronous Transfer Mode (STM). These signals are generally provided for protocols such as Synchronous Optical Network (SONET) and Synchronous Digital Hierarchy (SDH). Other possible protocols include Ethernet over fiber, Resilient Packet Ring (RPR), and the like, as will be appreciated by a person skilled in the art.

The network interface 202 recovers network synchronization signals 205 from the input signal and transmits them to the reference selection unit 206. The data from the input signals is transmitted through standard data-path functions 208, where they are processed for the local system. The data-path functions 208 may vary from application to application, but such functions are known in the art and need not be described in detail. Further, the timing termination unit 204 extracts timing information 207 from the BITS and transmits it to the reference selection unit 206. Both the timing information 207 and the network synchronization signals 205 are also transmitted to the other WAN ports to be coupled with their reference selection units.

Thus, the reference selection unit 206 also receives timing signals from other sources, such as backup or secondary WAN ports. The reference selection unit 206 selects a synchronization source from the plurality of received timing signals. The selection is made by the synchronization control unit 210 in accordance with either operator intervention or automatically using preset rules.

For example, signals transmitted in accordance with the GR-1244-CORE standard include a message within the signal for indicating the suitability of the synchronization signal. A DS1 timing signal is considered to have failed or to be unavailable under the following conditions: a loss of signal energy, which is indicated by a loss of signal (LOS) indicator at the local receiver; an alarm condition, which is indicated by a defined bit pattern referred to as the DS1 Alarm Indication Signal (AIS); and frame mismatch, indicated by out of frame (OOF) or loss of frame (LOF) indicators. These messages are stripped from the incoming signal at the network interface 202 and sent to the reference selection unit 206 along with the timing information.

In yet another example, signals transmitted in accordance with the GR-436-CORE standard include a message within the signal for indicating the suitability of the synchronization source. These messages, referred to as Synchronization Status Messages (SSMs), indicate the suitability of using an input signal as a synchronization source. SSMs can be carried in the messaging channels of SONET and DS1 links, and the like. These messages can convey whether or not the link should be used for synchronization as determined by the sourcing network element. Further, these messages convey the quality level of a clock source as indicated by the sourcing network element.

The above examples illustrate two methods for determining the validity of the synchronization signals. Other methods are known in the art and will be apparent to a person skilled in the art.

The synchronization control unit 210 is normally setup to use one of two timing signals, PRIMARY and BACKUP. The PRIMARY and BACKUP timing references are derived from like interfaces. For example, if the PRIMARY timing reference is extracted from the input signal, the BACKUP timing reference is extracted from the input signal. Similarly, if the PRIMARY timing reference is retrieved from the BITS, the BACKUP timing reference is retrieved from the BITS. There is normally no provision to switch types of timing sources although this could be done. Generally, the timing architecture is deemed to be reliably engineered and thus multiple backups are not typically provided. In the present embodiment, a single alternate combined WAN port/synchronization unit is provided as a backup.

Yet further, if none of the timing signals provided to the reference selection unit is deemed to be valid or lost due to cable cuts, a fall back mode is provided. In the fall back mode, a local network element returns to the previous valid clock setting, which is maintained by a local PLL. This mode is referred to as a HOLDOVER mode.

The timing signal selected by the reference selection unit 206 is output to the synchronization unit 212. The synchronization unit 212 provides signal conditioning to the recovered network synchronization signals in order to satisfy the service quality requirements imposed by relevant standards such as GR-1244-CORE, GR-303-CORE, and GR-253-CORE. The operation performed by the synchronization unit 212 is known in the art and thus need not be described in detail.

The selection of timing signals from a plurality of available signals provides a mechanism for synchronization path redundancy. This allows a network element to continue operating, even in the presence of line and equipment failures. (This concept will be explained in greater detail with reference to FIG. 3.)

The multiplexor 214 multiplexes the data output from the data-path function 208 with the timing signal received from the synchronization unit 212 and distributes the combined data and synchronization signal to the local network element system over a system backplane.

Figure 3:
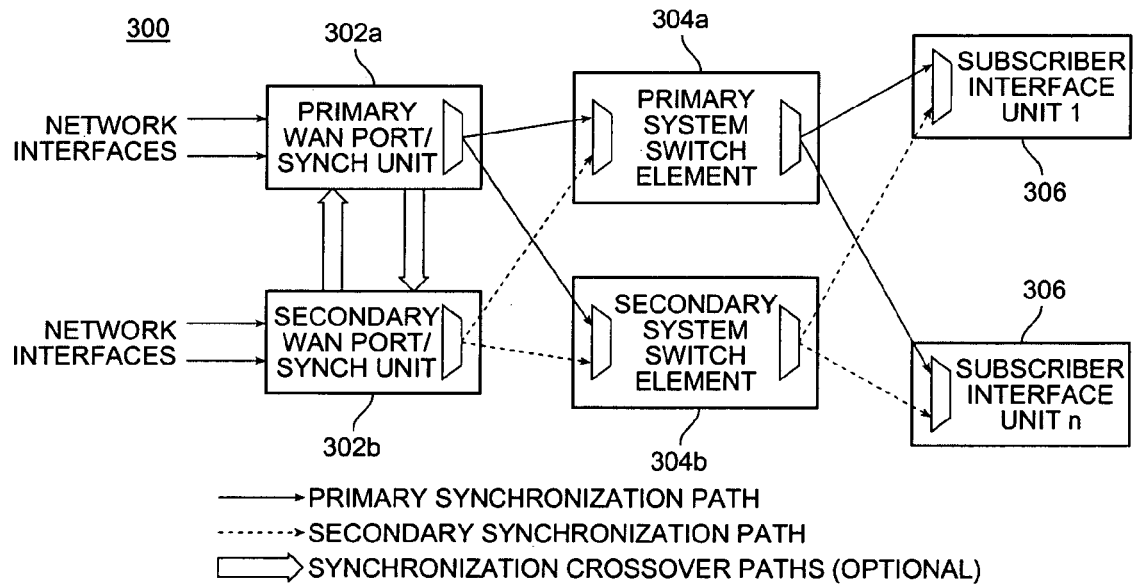
FIG. 3 is a schematic diagram of a redundancy scheme using the WAN port illustrated in FIG. 2.

Referring to FIG. 3, a simplified schematic of a network element system is illustrated generally by numeral 300. FIG. 3 illustrates various synchronization paths as well as the redundant nature of those paths for the purpose of illustrating the function of the combined WAN port synchronization unit 200 (see FIG. 2). The network element system 300 comprises a primary 302a and a secondary 302b combined WAN port/synchronization unit (corresponding to the port/unit 200 of FIG. 2), dual redundant system switch elements 304, and multiple, non-redundant, subscriber interfaces 306.

Each of the WAN port/synchronization units 302 is coupled with each of the system switch elements 304. Similarly, each of the system switch elements 304 is coupled to each of the subscriber interface elements 306. Each WAN port/synchronization unit 302 recovers network reference timing signals from its respective optical/electrical data interfaces (see FIG. 2). These extracted timing signals are made available to the other WAN port/synchronization units for providing redundant timing paths (as previously described above with reference to FIG. 2).

The system switch elements 304 in the present embodiment provide two functions. Firstly, they provide a redundant switch element for data and voice signals. Therefore, if one of the switches 304a is malfunctioning, the other switch 304b is used to route the data. Secondly, they provide redundant timing paths for network reference timing signals. Thus, if the network reference timing signal is disturbed en route to a system switch element 304a, the network reference timing signal can be routed through an alternate system switch element 304b. The system switch elements 304, either through operator intervention or autonomous control (based on predefined parameters), can choose either of the combined WAN port/synchronization unit outputs to use as its input. Typically, the system switch elements 304 select the output of the primary combined WAN port/synchronization unit 302a as their input. If, however, the system switch elements 304 do not receive such a signal, they switch their input to the output of the secondary combined WAN port/synchronization unit 302b.

In the present embodiment, the subscriber interfaces 306 provide both Plain Old Telephone Service (POTS), or analog voice, and asynchronous digital subscriber loop (ADSL) functions. Other types of subscriber interfaces will be apparent to a person skilled in the art. Each subscriber interface 306 receives network reference timing signals from each of the system switch elements 304. Similarly to the system switch elements 304, the subscriber interfaces 306 select the output of the primary system switch element 304a as their input. If, however, the subscriber interfaces 306 do not receive such a signal, they switch their input to the output of the secondary system switch element 304b.

Figure 4:
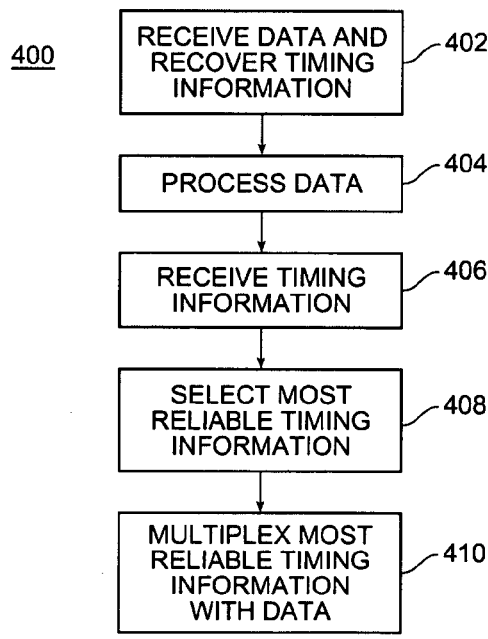
FIG. 4 is block diagram of a method according to an embodiment of the present invention.

FIG. 4 illustrates a method 400 according to an embodiment of the present invention. Such method may be implemented in hardware, software, firmware, or a combination thereof, or in similar manners. In step 402, the input is received and the data and primary timing information is recovered from the input. In step 404, the data is processed.

In step 406, a plurality of timing information is received. The plurality of timing information includes the primary timing information from the network interface and secondary timing information from a secondary combined WAN port/synchronization unit.

In step 408, the most reliable timing information is selected from the plurality of timing information. In step 410 the most reliable timing information is multiplexed with the data processed in step 404 across a link. The details of these steps are more fully discussed above with reference to FIG. 2.

It should be noted that the network element could be provisioned with any of the redundant elements or without any, depending on customer requirements. It should also be noted that the architecture towards the subscriber, from the subscriber interface unit, is well understood by a person skilled in the art and, thus, is not described here.

Although the invention has been described with reference to certain specific embodiments, various modifications thereof will be apparent to those skilled in the art without departing from the spirit and scope of the invention as outlined in the claims appended hereto.

What is claimed is:

1. A combined wide area network (WAN) port/synchronization unit for receiving an input including data and timing information, and for synchronizing said data for transmission, said unit comprising:
   a network interface that receives said input and that recovers said data and primary timing information from said input;
   a data-path function that processes said data;
   a reference selection unit that receives a plurality of timing information, said plurality of timing information including said primary timing information from said network interface and secondary timing information from a secondary combined WAN port/synchronization unit;
   a synchronization control unit that selects a most reliable timing information from said plurality of timing information input to said reference selection unit; and
   a multiplexor that multiplexes said most reliable timing information with said data processed by said data-path function across a link.

2. A unit as defined in claim 1, further comprising:
   a synchronization unit that conditions said most reliable timing information for meeting required standards, wherein said multiplexor multiplexes said most reliable timing information conditioned by said synchronization unit with said data processed by said data-path function.

3. A unit as defined in claim 1, further comprising:
   a timing termination unit that receives a further primary timing signal and that transmits said further primary timing signal to said reference selection unit.

4. A unit as defined in claim 1, wherein said input is a signal including both said data and said timing information.

5. A unit as defined in claim 1, wherein said input includes separate signals for said data and said timing information.

6. In a combined wide area network (WAN) port/synchronization unit, a method of receiving an input including data and timing information, and of synchronizing said data for transmission, comprising the steps of:

receiving said input and recovering said data and primary timing information from said input;

processing said data;

receiving a plurality of timing information, said plurality of timing information including said primary timing information from said network interface and secondary timing information from a secondary combined WAN port/synchronization unit;

selecting a most reliable timing information from said plurality of timing information; and multiplexing said most reliable timing information with said data processed in said step of processing across a link.

7. A method as defined in claim 6, further comprising:

conditioning said most reliable timing information for meeting required standards, wherein said step of multiplexing multiplexes said most reliable timing information conditioned in said step of conditioning with said data processed in said step of processing.

8. A method as defined in claim 6, further comprising:

receiving a further primary timing signal, wherein said step of selecting selects said most reliable timing information from said plurality of timing information and said further primary timing signal.

9. A method as defined in claim 6, wherein said input is a signal including both said data and said timing information.

10. A method as defined in claim 6, wherein said input includes separate signals for said data and said timing information.

* * * * *